Patented Sept. 22, 1925.

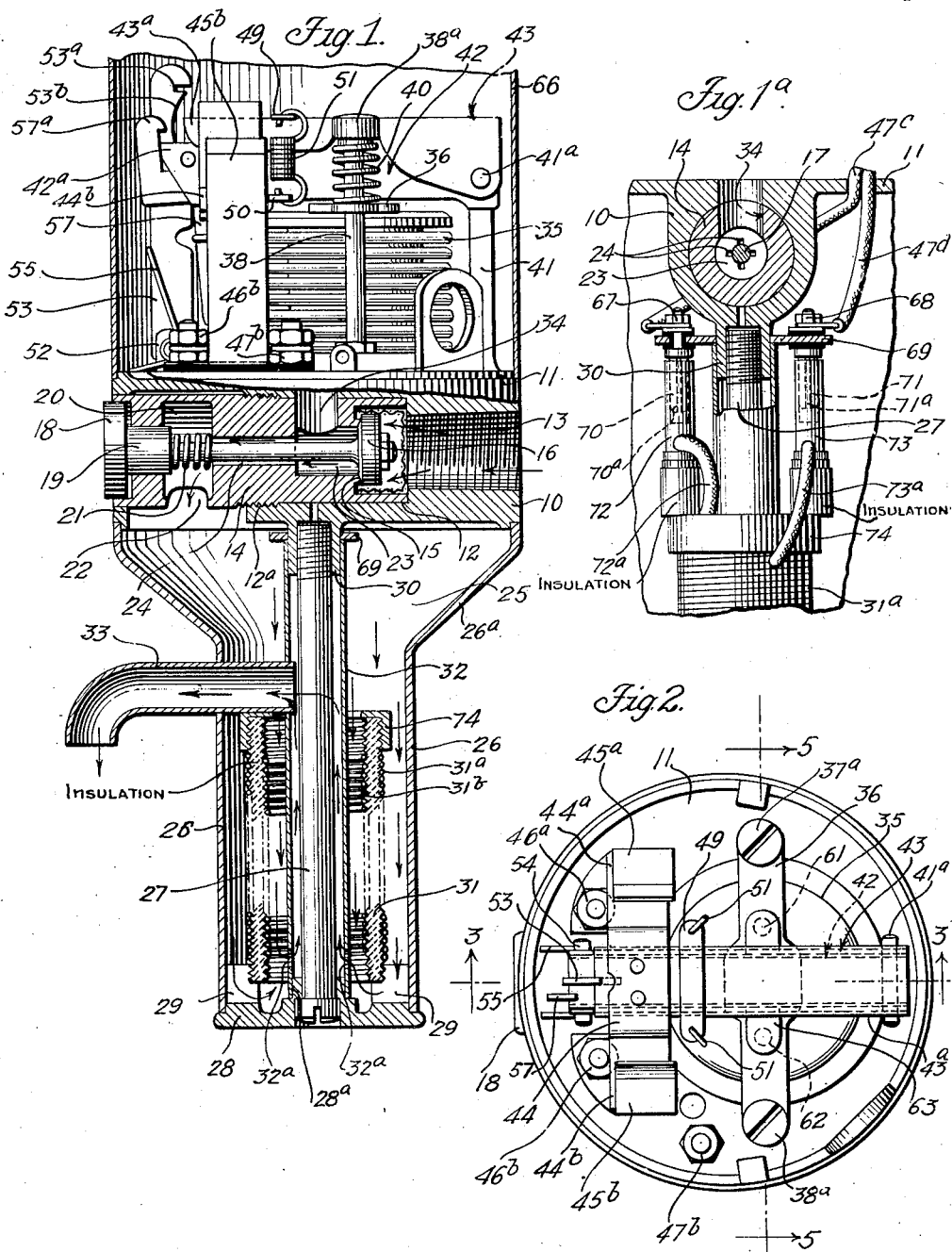

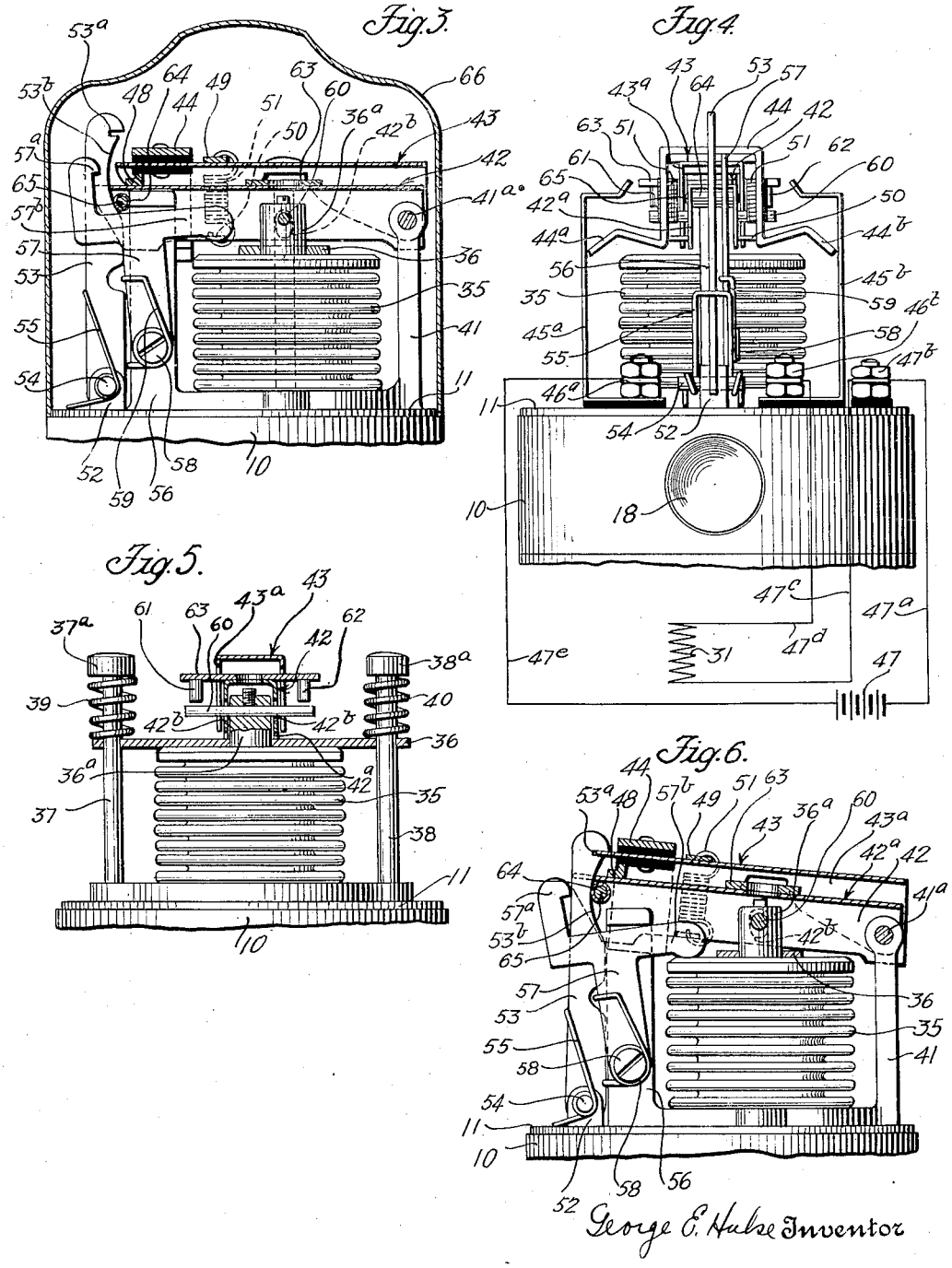

1,554,502

UNITED STATES PATENT OFFICE.

GEORGE E. HULSE, OF NEW HAVEN, CONNECTICUT, ASSIGNOR TO THE SAFETY CAR HEATING & LIGHTING COMPANY, A CORPORATION OF NEW JERSEY.

ELECTRIC WATER HEATER.

Application filed March 15, 1923. Serial No. 625,208.

*To all whom it may concern:*

Be it known that I, GEORGE E. HULSE, a citizen of the United States, and a resident of New Haven, in the county of New Haven and State of Connecticut, have invented an Improvement in Electric Water Heaters, of which the following is a specification.

This invention relates to water heaters and more particularly to electric water heaters for heating water as required.

One of the objects of this invention is to provide a practical apparatus for electrically heating water of reliable and dependable action and of compact and rugged construction. Another object is to provide apparatus of the above character in which dependability and positiveness of operation are insured and in which the several parts are reliably safeguarded against the possibility of injurious overheating. Another object is to provide apparatus of the above nature of efficient action and well adapted to meet the conditions of practical use. Other objects will be in part obvious or in part pointed out hereinafter.

The invention accordingly consists in the features of construction, combinations of elements and arrangements of parts as will be exemplified in the structure to be hereinafter set forth and the scope of the application of which will be indicated in the following claims.

In the accompanying drawings in which is shown one of various possible embodiments of this invention, Figure 1 is a central vertical section of the apparatus in assembled relation, certain parts being shown in elevation, however, to show their relation more clearly;

Figure 1ª is a transverse vertical sectional view, partly in elevation, showing the connection of the heating unit;

Figure 2 is a plan view of the apparatus as viewed from the top of Fig. 1;

Figure 3 is a central vertical section, partly in elevation, of the upper portion of the apparatus as seen on the line 3—3 of Fig. 2;

Figure 4 is a side elevation as viewed from the left in Fig. 1 and shows the upper portion of the apparatus, the casing being omitted for the sake of greater clarity of illustration;

Figure 5 is a sectional view, partly in elevation, on the line 5—5 of Fig. 2; and Figure 6 is a view substantially similar to that of Fig. 3 but showing the apparatus in a different stage of operation.

Similar reference characters refer to similar parts throughout the several views of the drawings.

Referring now to the drawings, and more particularly to Fig. 1, there is shown a main casting 10 having a substantially flat upper portion 11 upon which certain parts of the apparatus may be conveniently mounted, and having at a substantially central portion thereof a substantially cylindrical recess 12, the right-hand end of which as viewed in Fig. 1 is in communication with the exterior as by the cylindrical opening 13 which is preferably tapped or threaded in order to permit a connection to be made with any suitable source of water supply. At the left-hand end of the substantially cylindrical recess 12 the latter is threaded as at 12ª in order that a suitable valve mechanism may be detachably mounted with respect to the main casting 10. This valve mechanism preferably comprises a casting 14 which is threaded into the threaded end of the recess 12, and at its right-hand end carries a valve seat 15 with which a disk-like valve member 16 coacts in order to control the passage of water from the connection made to the water supply at the opening 13. The valve member 16 is mounted upon one end of a valve stem 17 which extends through and is suitably supported for longitudinal movement with respect to the valve casting 14. At the left-hand end the valve stem 17 terminates in a push button 18 which is disposed exteriorly of the casting 10 in order to permit manual operation of the valve 16.

The push button 18 is connected in any suitable manner to the left-hand end of the valve stem 17 preferably, however, by means of the cylindrical extension 19 which is slidably supported in a suitable bearing surface formed in the left-hand end of the valve casting 14 and thus acts to assist in supporting the valve stem 17 for longitudinal movement. The valve casting 14 is recessed as at 20, within which recess and surrounding the valve stem there is mounted a compression spring 21 adapted to maintain the valve member 16 seated upon its seat 15. The recess 20 is provided with a downwardly directed opening 22 adapted to communicate with the heating unit and its associated parts to be more clearly described hereinafter. At its right-hand end the valve casting 14 is also recessed as at 23 and the intervening portion of the valve casting 14 is adapted to slidably support the valve stem 17. Upon a movement toward the right as viewed in Fig. 1 in response to a manual operation of the push button 18 against the action of the spring 21, the valve member 16 is unseated to place the recessed end of the casting 14 in communication with the source of water supply. Intervening the two recesses 20 and 23 and in communication therewith is a restricted water passage 24, and this passage 24 may conveniently be made adjacent the valve stem 17 in order thus to place the recess 20 in communication with the recess 23. The flow of water may therefore take place from the recess 23 through the restricted passage 24, the recess 20, opening 22, to a chamber, generally indicated at 25 and in general of a cylindrical shape, within which is preferably positioned the electric heating unit.

The chamber 25 may conveniently be formed by the interior of a substantially cylindrical sheet metal member or housing 26 flared outwardly at its upper end as at 26ª to permit making a sealed connection with the main casting 10. The housing 26 is preferably held in assembled relation with respect to the main casting 10 by means of the cap screw 27 and the end cap 28 forming the bottom for the housing 26. The cap screw 27 is threaded at its upper end into a suitably formed collar 30 preferably formed integrally with the main casting 10. The end cap 28 is provided with a plurality of projections 29 spaced from one another circumferentially and also spaced from the center of the end cap 28, and upon these projections 29 is supported a substantially cylindrical and hollow core 31 composed of a suitable insulating material and having disposed upon both its interior and exterior surfaces a suitable resistance element. This resistance element may conveniently take the form of a winding 31ª of a suitable resistance wire wound upon the exterior of the core 31 and a second winding 31ᵇ positioned and suitably mounted upon the interior of the core 31. Preferably the core 31 is formed both upon its interior and exterior surfaces with threads of suitable pitch, the grooves of which may conveniently support the resistance wire. Moreover, the exterior threaded part of the core 31 may conveniently be placed in threaded engagement with the spaced projections 29 on the end cap 28, in order thus to hold the heating unit in position and in spaced relation with respect not only to the cylindrical housing 26 but also to a centrally positioned tube 32 supported at its upper end by the collar 30 hereinbefore described. At its lower end the tube 32 is supported in spaced relation with respect to the cap screw 27 by means of the cylindrical collar 28ª integrally formed upon the end cap 28. The tube 32 is thus held by the collars 30 and 28ª in spaced relation with respect to the cap screw 27 which it surrounds and forms therewith an annular passage. At a convenient point, and preferably adjacent the upper end of the tube 32, the latter is connected to a discharge spout 33 passing outwardly through the housing 26. At the lower end of the tube 32 suitable openings 32ª are provided to place the annular passage therein in communication with the lower end of the chamber 25 formed within the cylindrical housing 26.

Considering now the further path of flow of water as it is passed from the source of supply connected at the opening 13 through the passage 22 under the control of the valve member 16, the water flows downwardly in the chamber 25 provided by the housing 26 and upon reaching the heating unit 31 the water is split up into an interior and an exterior relatively thin and substantially annular stream, being thus brought into intimate thermal relation with the windings 31ª and 31ᵇ of the electric heating unit. Upon reaching the bottom of the interior of the housing 26 the two annular streams pass through the openings 32ª in the lower end of the tube 32 wherein the water is made to flow in a relatively thin annular stream and in an upward direction whence it may be discharged through the spout 33. During its upward passage through the tube 32 the water is again brought into thermal relation with the heating unit 31 and there is thus brought about an effective heating action. In Fig. 1 of the drawings the path of flow of the water is clearly indicated by the arrows.

At this point it might be noted that the heating unit may be suitably treated with any suitable insulating compound, such as bakelite or enamel for example, in order thereby to insulate the electrical parts from the water passing in contact therewith, and it might also be noted that the terminals of the windings of the heating unit may be connected in any suitable manner to the binding posts associated with the circuit-controlling mechanism to be more clearly hereinafter described.

Considering now the current-controlling means, it will first be noted that the recess 23 in the valve casting 14 adjacent the valve member 16 has in communication therewith an upwardly extending passage 34 passing through the upper supporting plate 11 integrally formed with the main casting 10, thus placing in communication with the water after its passage by valve 16 and thus exposing to the pressure thereof a pressure-responsive device preferably taking the form of an expansible corrugated sleeve-like member 35 having its lower end fixed to the plate 11 and having its upper end closed. Upon unseating the valve member 16 by manually operating the push button 18, the water through its pressure is effective to cause the expansion longitudinally of the sleeve member 35, being effective upon the member 35 through a relatively large and unrestricted passage 35 as compared with the relatively small or somewhat restricted passage 24 leading the water to the heating unit. There is thus insured an effective pressure-responsive action of the expansible sleeve member 35.

Referring now more particularly to Fig. 5, the upper closed end of the sleeve 35 carries a transversely extending plate 36 in slidable engagement at its outer ends with the posts 37 and 38 rigidly mounted upon the base plate 11. Interposed between the plate 36 and the headed ends 37ª and 38ª and surrounding the posts 37 and 38, respectively, are the springs 39 and 40 against which the expansion of the sleeve 35 in response to the pressure of the water takes place. The upper closed end of the sleeve 35 is thus guided during its movements in a vertical direction and, moreover, a positive return movement to normal of the upper end or plate 36 of the pressure-responsive member 35 is assured. Thus it will be seen that upon the pressure-responsive member 35 being exposed to the pressure of water under the control of the valve 16 the transverse plate 36 is moved upwardly, as viewed in Fig. 5 for example, and upon a removal of the pressure acting upon the member 35, as, for example, by the closure of the valve 16, the plate member 36 is given a retrograde movement by the return to normal of the member 35. This retrograde movement, taking place in a downward direction as viewed in Fig. 5, is assured by the action of the springs 39 and 40.

To the right of the sleeve member 35, as viewed in Figs. 2, 3 and 6, is positioned a vertically extending post 41 preferably integrally formed with the base plate 11 and supporting at its upper end a pin 41ª upon which are pivoted the levers 42 and 43. The levers 42 and 43 are preferably formed of sheet metal and are bent laterally and downwardly to provide substantially vertically depending side walls 42ª and 43ª, respectively. This formation of the levers 42 and 43 is conducive not only to rigidity and strength of construction, but also to compactness, since, as will be seen from Figs. 2 and 5, the lever 42 is substantially housed within and underneath the lever 43. Moreover, the side wall portions 42ª and 43ª extending downwardly in depending relation also make possible greater convenience of construction and interrelation of these levers with the various other parts to be more clearly hereinafter described.

At its outer end remote from the pivoting pin 41ª (see Figs. 2 and 3) the lever 43 has mounted thereon and suitably insulated therefrom a switch member 44 extending transversely of the lever 43 and having two depending and laterally extending spring arms 44ª and 44ᵇ (see Fig. 4) adapted to coact, respectively, with the upstanding spring contacts 45ª and 45ᵇ inserted in the circuit of the electric heating unit hereinbefore described. Thus, the spring contact 45ª with its associated binding post 46ª may be mounted upon the base plate 11 and insulated therefrom in any suitable manner, whereas the other spring contact 45ᵇ may be substantially similarly associated, with its binding post 46ᵇ, with respect to the base plate 11. In Fig. 4 is diagrammatically indicated the electric circuit and it will be noted that from any suitable source of supply, indicated at 47 as a battery, a conductor 47ª leads to a main connecting binding post 47ᵇ mounted upon and insulated from the base member 11 and adapted to facilitate the connection of the apparatus to the desired source of supply. From the binding post 47ᵇ a conductor 47ᶜ leads to the heating unit, diagrammatically indicated at 31, and from the heating unit 31 a conductor 47ᵈ leads to the binding post 46ᵇ which is, as above noted, in electrical connection with the spring contact 45ᵇ. The binding post 46ª associated with the other spring contact 45ª is adapted to facilitate the connection of the apparatus as by a conductor 47ᵉ to the other side of the source of current supply 47. Thus, referring still to Fig. 4, it will be seen that with the parts in the position there shown the circuit controlling the flow of current to the resistance element 31 is broken since the switch member 44 is in its lowermost position and out of contact with the spring contacts 45ª and 45ᵇ. Upon the switch member 44 being moved upwardly to throw its respective end portions 44ª and 44ᵇ in connection with the upper ends of the spring contacts 45ª and 45ᵇ, respectively, the circuit will be closed, the spring contacts 45ª and 45ᵇ insuring a good electrical circuit-closing contact with the switch member 44.

Considering now the means for controlling the operation of the switch member 44, it may be noted that the levers 42 and 43 are normally in substantially the position shown in Fig. 3, a small post 48 suitably secured to the upper portion of the lever 42 and adapted to contact with the under side of the lever 43 acting to limit the movement of these two levers toward each other. A bar 49 (see Figs. 2 and 3) is mounted upon the upper part of the lever 43 so as to project laterally on each side thereof, and in substantial alignment with the projecting end parts of the bar 49 there are provided in the side wall portions 42a of the lever 42 laterally projecting and horizontally extending ears 50 adapted to be engaged by and to support at their lower ends the springs 51, one on each side of the levers 42 and 43 (see Figs. 2 and 4), the upper ends of these springs 51 being engaged by the projecting ends of the cross-bar 49. The springs 51, which are tension springs, tend to hold the two levers 42 and 43 in interengaging relation as determined by the post 48 (see Fig. 3) yet may be stressed to permit independent movement of one lever away from the other.

To the left of the expansible pressure-responsive device or sleeve 35 (see Figs. 2 and 3) is positioned a vertically extending post 52 preferably integrally formed with the base plate 11 and preferably bifurcated, as is more clearly shown in Fig. 4, to permit pivotal mounting with respect thereto of a vertically extending latch member 53, as by the pivoting pin 54. The latch member 53 extends vertically to a sufficient extent so that its recessed end 53a is substantially within the range of the extreme upper limit of movement of that end of the lever 43 upon which the switch member 44 is mounted. A spring 55 supported by the pivoting pin 44 and having its ends abutting against the base plate 11 and against the latch member 53 (see Fig. 3) tends to swing the latch member 53 toward the right so that as the switch-carrying end of the lever 43 is moved upwardly by a clockwise swinging of the lever 43 about the pivot 41a, the left-hand end of the sheet metal lever 43 will ride into the recess 53a in the extreme upper end of the latch member 53, thus locking the lever 43 and its associated switch member 44 in circuit-closing relation with respect to the spring contacts 45a and 45b. This relation of these parts is clearly shown in Fig. 6.

The upper end of the latch member 53 below the recessed portion 53a is formed to provide a substantially arcuate cam surface 53b with which the extreme left-hand end of the lever 43 is placed in engagement as it is moved upwardly, thus in effect acting as a cam surface to swing the latch or locking member 53 against the action of the spring 55 in order thus to permit interlocking engagement of these parts at the completion of the circuit-closing movement of the lever 43.

Adjacent the post 52 which supports the locking member 53 and somewhat displaced laterally therefrom (see Fig. 4) is another vertical post 56 which pivotally supports another latch member 57 as by the pivoting cap screw 58. The locking member 57 is adapted to coact with the left-hand end of the lever 42 and is provided with an inwardly directed substantially hook-shaped end portion 57a urged inwardly toward the lever 42 by the spring 59, conveniently supported by the pivoting member 58, so as to tend to limit the upward movement of the left-hand end (as viewed in Fig. 3) of the lever 42 as the latter is swung in clockwise direction about the pivoting member 41a. The latch member 57, moreover, is provided with an inwardly extending arm 57b preferably integrally formed therewith and positioned in the path of upward movement of the upper end of the pressure-responsive device 35. Thus, referring to Fig. 3, it will be seen that the latch member 57 has its hook-shaped end 57a urged inwardly into engagement with the left-hand end of the lever 42 so that upon an upward movement of this end of the lever, by means more clearly hereinafter described, the lever 42 will be restrained from continued movement by the hook-shaped end 57a, thus locking the lever 42 against further movement. Since the levers 42 and 43 are interconnected and held normally in the relation shown in Fig. 3 by the springs 51 it will thus be seen that the lever 43 with its associated switch member 44 will be locked in circuit-opening position, as is clearly shown in Fig. 4. These parts, thus locked against further movement or against movement into circuit-closing relation, are adapted to be released to make the circuit-closing movement preferably only upon a release of the lever 42 by the hook-shaped end 57a of the latch 57. This release is preferably brought about through the arm 57b which swings the hook-shaped end 57a to the left, as viewed in Fig. 3, as the arm 57b is engaged by the pressure-responsive device 35 and moved thereby only, however, after a predetermined movement of the upper end of the latter has taken place.

Turning now to the connection of the levers 42 and 43 with the pressure-responsive device 35, reference is particularly to be had to Fig. 5 of the drawings in which it will be seen that at a substantially central point in the transverse member 36 associated with the upper end of the pressure-responsive device 35 there is mounted to be movable therewith a post 36a. The post 36a has rigidly mounted thereon a transversely extending operating bar 60 which passes through vertically extending slots 42b in the depending side portions 42a of the lever 42 (see more particularly Fig. 6) in order to form therewith a lost motion connection. As seen in Fig. 5, the bar 60 extends to a substantial extent laterally of the lever 42, suitable provision being made in the depending side portions 43a of the lever 43, as by cutting such portions away, to permit freedom of movement of the operating bar 60 with respect to the lever 43.

The respective lateral projecting ends of the bar 60 are adapted to coact with the pins 61 and 62 depending downwardly from a transversely extending spring member 63 suitably secured to the upper portion of the lever 42 as by spot-welding, for example, in order to permit the spring member 63 to be flexed as the operating cross-bar 60 moves upwardly as seen in Fig. 5 in response to an expansion of the device 35 when exposed to the pressure of the water in the apparatus in the manner hereinbefore described.

Bearing in mind that the parts in normal or circuit-opening position bear the relations to one another as shown in Figs. 3, 4 and 5, a manual depression of the push button 18 (see Fig. 1) opens the valve member 16 and permits the pressure of the water to be communicated through the passage 34 to the interior of the expansible sleeve member 35, which thereupon brings about an upward movement of the transversely extending member 36 (see Fig. 5) against the normal resistance of the device 35 itself to expansion and also against the springs 39 and 40 acting upon the member 36. The resultant movement upwardly of the member 36 in response to the pressure-responsive device 35 thus stresses the springs 39 and 40 and stores energy therein.

As will be seen from Fig. 5, the upward movement of the member 36 brings about a like movement of the cross-rod 60 which is carried into engagement with the pins 61 and 62, thus tending to swing the lever 42 (and also the lever 43) in clockwise direction as viewed in Fig. 3 about the pivot 41ª. Such movement of the levers, however, is limited by the hook-shaped end 57ª of the locking or latching member 57, which holds these parts, and particularly the lever 42 with which it directly engages, against further movement. The water pressure being continuously effective, however, in the device 35, continues the upward movement of the operating bar 60, thus carrying the pins 61 and 62 upwardly with it and bowing or stressing the spring member 63 upon which the pins are mounted. Thus there is stored in the stressed spring member 63 a substantial amount of energy.

After a substantial stressing of the member 63 has taken place, the upper end face of the device 35 engages the arm 57ᵇ of the locking member 57 and swings the hook-shaped end 57ª of this member out of locking engagement with the lever 42 and thus suddenly releasing the energy stored in the member 63. The latter at once resumes its normal straight-line relation and in so doing snaps the lever 42 together with the lever 43 about their pivot 41ª and into substantially the relation shown in Fig. 6 in which it will be noted that the locking member 53 has been made effective to engage the lever 43 and lock it, as well as the switch member 44, in circuit-closing position. The parts retain this position substantially as long as the valve member 16 is open to expose the pressure-responsive device 35 to the pressure of the water passing through the device. The switch member 44 having thus closed the circuit to the electric heating unit, the water flowing through the device and discharging at the outlet end or spout 33 is efficiently heated.

After the desired quantity of hot water has been drawn, push button 18 is released thus permitting the valve member 16 to be closed. The pressure is thus removed from the pressure-responsive device 35 and the latter begins to contract to assume its normal unexpanded form, being aided by the springs 39 and 40. The downward movement (as viewed in Figs. 5 and 6) of the transverse member 36 is effective through the operating cross-bar 60 to bring about a counter-clockwise partial rotation of the lever 42 about its pivot 41ª, it being understood that the locking member 53 is during this action operative to hold the lever 43 with its switch member 44 in circuit-closing position, as shown in Fig. 6. During the downward movement of the left-hand end of the lever 42 the springs 51 are stressed and thus have stored therein a substantial amount of energy. As will be seen in Figs. 4 and 5, there is mounted in the forward or left-hand end of the lever 42 a roller 64, the latter being rotatably supported upon a small shaft 65 supported in the depending side portion 42ª of the lever 42. This roller coacts with the cam surface 53ᵇ of the locking member 53 and during the downward movement of the left-hand end of the lever 42 the roller 64, acting through the cam surface 53ᵇ, swings the recessed end 53ª of the locking member 53 away from the engaged end of the switch-carrying lever 43. The release of the lever 43, however, takes place preferably only after a substantial stressing of the springs 51, as hereinbefore described, has been effected so that the energy stored in these springs 51, upon being released, is effective to snap the lever 43 in counter-clockwise direction about its pivot 41ª, thus suddenly interrupting the circuit and cutting the current to the heating element off without detrimental sparking at the switch contacts.

As the upper end face of the pressure-responsive device 35 moves downwardly, the spring 59 is permitted to return the locking member 57 to normal, since the upper end face of the device 35 disengages the arm 57ᵇ to permit this return action to take place.

The parts then assume the relation shown in Fig. 3 of the drawings and are in readiness for subsequent operation.

The current-controlling apparatus hereinabove described may conveniently be encased in a dome-shaped cover 66 mounted above the base plate portion 11 of the main casting 10. It will be seen that removal of the cover 66 conveniently exposes certain parts of the apparatus and thus provides convenient and ready access thereto.

As hereinabove noted, the heating unit has its core 31 preferably in threaded engagement with the spaced projections 29 on the end cap 28, and it will be seen that upon removing the cap screw 27 the end cap 28 with the heating unit mounted thereon may be readily removed from the apparatus. Access to the heating unit is thus readily gained for purposes of replacement or repair, for example, and particularly for the purpose of removing deposited foreign matter, such as scale, from the heating windings, which scale, if allowed to accumulate, might detrimentally affect the heating action of the unit.

In order to permit the ready removal and replacement of the heating unit without disturbing the electrical connection thereof to the current-controlling apparatus mounted in the upper part of the device, the conductors 47$^c$ and 47$^d$, diagrammatically shown in Fig. 4, are led through a suitable opening in the flat upper portion 11 of the main casting 10 to a pair of binding posts 67 and 68 fixedly positioned in the upper part of the chamber 25 (see Fig. 1$^a$). The binding posts 67 and 68 are mounted upon and suitably insulated from a transversely extending plate member 69 suitably apertured to receive the depending extension or collar 30 (see also Fig. 1) of the main casting 10 and rigidly secured thereto in any suitable manner. The binding posts 67 and 68 are provided with downwardly directed contact members 70 and 71, respectively, preferably of cylindrical form and slotted as at 70$^a$ and 71$^a$ to provide in each contact member two oppositely disposed parts yielding with respect to one another. The contact members 70 and 71 are adapted to be received within the sleeve-like contact members 72 and 73, respectively, suitably mounted upon the upper end of the core 31 of the heating unit, as, for example, by the collar 74 (see also Fig. 1) conveniently threaded upon the exterior of the core 31. From the sleeve contact 72 a conductor 72$^a$ leads to one terminal of the windings 31$^a$ and 31$^b$, and from the sleeve contact 73 a conductor 73$^a$ leads to the other terminal of these heating windings.

Thus it will be seen that, as the heating unit is inserted within the housing 26, the sleeve contacts 72 and 73 are telescoped over the fixed contact members 70 and 71, respectively, and thus insert the heating element in the proper circuit. Likewise, it will be readily seen that upon removing the heating unit as hereinabove described the disconnection of the unit from the circuit is readily brought about.

The lower ends of the split contact members 70 and 71 may be conveniently tapered or rounded, as is indicated in Fig. 1$^a$, in order to facilitate the making of the electrical connection thereof with their respective sleeve contacts. Moreover, the contact members 70 and 71 in being slotted insure a yielding contact thereof with the sleeve contacts and thus insure a good electrical connection.

It will thus be seen that there has been provided in this invention a practical water-heating apparatus in which the several objects of this invention, as well as many advantages, are achieved. It may be noted that the apparatus is of rugged construction, positive action, and may be manually controlled in an exceedingly simple manner. It may further be noted that the electric heating unit is amply safeguarded against overheating, not only in that it is arranged so as to be constantly submerged in water irrespective of the flow therethrough of water, but also in that its energization and consequent heating action are effectively controlled in accordance with the presence or absence of water passing through the apparatus.

As many possible embodiments may be made of this invention and as many changes might be made in the embodiment above set forth, it is to be understood that all matter hereinbefore set forth or shown in the accompanying drawings is to be interpreted as illustrative and not in a limiting sense.

I claim as my invention:

1. In apparatus of the character described, in combination, means providing a path of flow for water, an electric heating unit interposed therein and adapted when energized to heat the water passing through said means, means for controlling the flow of current to said heating unit, and means responsive to the pressure of the water in said path for closing said current-controlling means.

2. In apparatus of the character described, in combination, means providing a path of flow for water, an electric heating unit interposed therein and adapted when energized to heat the water passing through said means, a switch controlling the flow of current to said heating unit, and means connected with said switch and movable in response to the pressure of water in said path for operating said switch.

3. In apparatus of the character described, in combination, means providing a path of flow for water, an electric heating unit interposed therein and adapted when energized to heat the water passing through said means, a switch controlling the flow of current to said heating unit, and expansible means adapted to be exposed to the water in said path having a connection with said switch and adapted in response to the pressure of the water to control the operation of said switch.

4. In apparatus of the character described, in combination, means providing a path of flow for water, an electric heating unit interposed therein and adapted when energized to heat the water passing through said means, a switch controlling the flow of current to said heating unit, and an expansible chamber fixed at one end and having its movable end connected with said switch, said chamber being adapted to be exposed to the pressure of water in said path for controlling the operation of said switch.

5. In apparatus of the character described, in combination, means providing a path of flow for water, an electric heating unit interposed therein and adapted when energized to heat the water passing through said means, a switch controlling the flow of current to said heating unit, means for locking said switch in open position, means movable in response to the pressure of water in said path, and means forming a connection between said pressure-responsive means and said switch adapted to have energy stored therein upon movement of said pressure-responsive means, said pressure-responsive means being adapted upon a predetermined energy-storing movement thereof to release said locking means and thereby to permit said energy-storing means to move said switch into closed position.

6. In apparatus of the character described, in combination, means providing a path of flow for water, an electric heating unit interposed therein and adapted when energized to heat the water passing through said means, a switch controlling the flow of current to said heating unit, means for locking said switch in open position, means movable in response to the pressure of water in said path, means forming a connection between said pressure-responsive means and said switch adapted to have energy stored therein upon movement of said pressure-responsive means, and means associated with and operative upon said locking means and positioned in the path of movement of said movable pressure-responsive means adapted upon a predetermined movement thereof to release said locking means.

7. In apparatus of the character described, in combination, means providing a path of flow for water, an electric heating unit interposed therein and adapted when energized to heat the water passing through said means, a switch controlling the flow of current to said heating unit, a latch for holding said switch in open position, means movable in response to the pressure of the water in said path-forming means, means forming a yielding connection between said movable pressure-responsive means and said switch, and an arm rigidly connected with said latch and projecting into the path of movement of said pressure-responsive means adapted upon a predetermined movement of said means to be engaged thereby and to release said latch.

8. In apparatus of the character described, in combination, means providing a path of flow for water, an electric heating unit interposed therein and adapted when energized to heat the water passing through said means, a switch controlling the flow of current to said heating unit, means for locking said switch in open position, means movable in response to the pressure of water in said path, spring means forming a connection between said movable means and said switch adapted upon movement of the former to be stressed thereby, and means effective after a predetermined movement of said pressure-responsive means to release said locking means.

9. In apparatus of the character described, in combination, means providing a path of flow for water, an electric heating unit interposed therein and adapted when energized to heat the water passing through said means, a switch controlling the flow of current to said heating unit, means for locking said switch in open or closed position, means movable in response to the pressure of water in said path, means forming a connection between said pressure-responsive means and said switch adapted upon movement of said pressure-responsive means in one direction in response to pressure or upon movement in the other direction due to the absence of pressure on said pressure-responsive means to have energy stored therein, and means adapted upon a predetermined movement of said pressure-responsive means in either direction to release said locking means to permit the expenditure of said stored energy in said connecting means to permit closure or opening of said switch in accordance with the pressure-responsive means or a movement due to absence of pressure respectively.

10. In apparatus of the character described, in combination, means providing a path of flow for water, an electric heating unit interposed therein and adapted when energized to heat the water passing through said means, a switch adapted to be closed to energize said heating unit, means for locking said switch in closed position, means movable in one direction in response to the pressure of the water in said path and adapted to partake of a retrograde movement due to the absence of pressure in said path, means forming a yielding connection between said movable pressure-responsive means and said switch adapted upon retrograde movement of said former means to be stressed, and means effective on a predetermined retrograde movement of said pressure-responsive means to release said locking means and thereby to permit opening of said switch.

11. In apparatus of the character described, in combination, means providing a path of flow for water, an electric heating unit interposed therein and adapted when energized to heat the water passing through said means, a switch member for controlling the flow of current to said heating unit, means for locking said switch member upon movement thereof, energy-storing means associated with said switch member, means movable in response to the pressure of water in said path adapted upon movement thereof to store energy in said last-mentioned means, and means adapted upon a predetermined energy-storing movement of said movable means to release said locking means and permit movement of said switch member to take place.

12. In apparatus of the character described, in combination, means providing a path of flow for water, an electric heating unit interposed therein and adapted when energized to heat the water passing through said means, a switch member for controlling the flow of current to said heating unit, means for locking said switch member upon movement thereof, energy-storing means associated with said switch member, means movable in response to the pressure of water in said path adapted upon movement thereof to store energy in said last-mentioned means, and means including a cam operative upon said locking means and affected by said movable means, said cam being shaped to release said locking means upon a predetermined movement of said movable means.

13. In apparatus of the character described, in combination, a switch member, locking means adapted to hold said switch in open position, locking means adapted to hold said switch in closed position, a movable member for controlling the operation of said switch, means associated with said switch member and adapted upon movement of said controlling member in either direction to have energy stored therein, and releasing means associated with said locking means adapted upon a predetermined energy-storing movement of said controlling member in one direction to release said first locking means to permit the expenditure of energy in said energy-storing means to close said switch member and upon a predetermined movement in reverse direction to release said second locking means to permit opening of said switch.

14. In apparatus of the character described, in combination, a switch member, locking means adapted to hold said switch member in closed position, a movable member for controlling the operation of said switch member, energy-storing means interposed between said switch member and said controlling member adapted upon movement of the latter to have energy stored therein, and means effective upon a predetermined movement of said controlling member to release said locking means and to permit the expenditure of the stored energy in said last-mentioned means to effect an opening of said switch member.

15. In apparatus of the character described, in combination, a movable switch member, means for locking said switch member upon movement thereof, a movable member for controlling the operation of said switch member, energy-storing means interposed between said switch member and said controlling member adapted upon movement of the latter to have energy stored therein, and means adapted upon a predetermined energy-storing movement of said controlling member to release said locking means and permit the expenditure of said stored energy in said last-mentioned means to effect a movement of said switch member.

16. In apparatus of the character described, in combination, means providing a path of flow for water, an electric heating unit interposed therein and adapted when energized to heat the water passing through said means, means for controlling the flow of current to said heating unit, hydraulic means for controlling the operation of said current-controlling means, and a valve for controlling the flow of water through said path and the exposing of said hydraulic means to the water in said path.

17. In apparatus of the character described, in combination, means providing a path of flow for water, an electric heating unit interposed therein and adapted when energized to heat the water passing through said means, means for controlling the flow of current to said heating unit, means responsive to the pressure of water in said path for controlling the operation of said current-controlling means, a valve for controlling both the flow of water through said path and the exposing of said pressure-responsive means to the pressure of water in said path, and a restricted passage in said path-forming means interposed between the outlet end of said path and said pressure-responsive means to insure effective pressure-responsive action thereof.

18. In apparatus of the character described, in combination, means providing a path of flow for water and having an inlet end and an outlet end, an electric heating unit interposed therein and adapted when energized to heat the water passing through said path, a switch for controlling the flow of current to said heating unit, a valve positioned adjacent the inlet end of said path for controlling the flow of water therethrough, means responsive to the pressure of water in said path and adapted to be exposed thereto only after operation of said valve for controlling the operation of said switch, and a restricted passage interposed in said path between the outlet end thereof and said pressure-responsive means.

19. In apparatus of the character described, in combination, a casing adapted to form a path of flow for water therethrough, an electric heating unit adapted to heat water passing through said casing and adapted to be inserted in said casing, a fixed contact member mounted within said casing, and means mounted upon said heating unit and connected to one terminal thereof adapted to detachably engage said fixed contact upon said unit being inserted in said casing.

20. In apparatus of the character described, in combination, a casing adapted to form a path of flow for water therethrough, an electric heating unit adapted to heat water passing through said casing and adapted to be inserted in said casing, and a pair of electrical contacts adapted to be yieldingly engaged with one another, one of said contacts being fixedly mounted upon the interior of said casing and the other being mounted upon said heating unit and in connection with one terminal thereof.

21. In apparatus of the character described, in combination, a casing adapted to form a path of flow for water therethrough, an electric heating unit adapted to heat water passing through said casing and adapted to be inserted in said casing, and a pair of electrical contacts, one of said contacts being formed to provide a socket and the other of said contacts being formed to be received within said socket, one of said contacts being mounted within said casing and the other being mounted upon said heating unit and in electrical connection with one terminal thereof.

22. In apparatus of the character described, in combination, a casing adapted to form a path of flow for water, an electric heating unit having mounted thereon a pair of contact members, means for detachably mounting said heating unit in said casing, and a pair of contacts fixedly positioned with respect to said casing and each adapted to be engaged by one of said contacts on said heating unit when the latter is inserted in said casing.

23. In apparatus of the character described, in combination, means providing a path of flow for water, an electric heating unit interposed therein and adapted when energized to heat the water passing through said means, a switch member for controlling the flow of current to said heating unit, means for locking said switch member upon movement thereof, a movable member responsive to the pressure of water in said path for controlling the operation of said switch member, energy-storing means interposed between said switch member and said pressure responsive member and adapted upon movement of the latter to have energy stored therein, a valve for controlling the flow of water through said path and for exposing said pressure responsive member to the water in said path, and means effective upon a predetermined energy-storing movement of said pressure responsive member to release said locking means and to permit the expenditure of the stored energy to effect a movement of said switch member.

24. In apparatus of the character described, in combination, means providing a path of flow for water, an electric heating unit interposed therein and adapted when energized to heat the water passing through said means, a switch member for controlling the flow of current to said heating unit, locking means adapted to hold said switch member in open position, a movable member responsive to the pressure of water in said path for controlling the closing of said switch member, means interposed between said switch member and said pressure responsive member and adapted upon movement of the latter to become stressed, a valve for controlling the flow of water through said path and for exposing said pressure responsive member to the water in said path and thus to effect a movement thereof, and means effective after a predetermined stressing of said interposed member has taken place to release said locking means and to permit said stressed member to effect a closing of said switch member.

25. In apparatus of the character described, in combination, means providing a path of flow for water, an electric heating unit interposed therein and adapted when energized to heat the water passing through said means, a switch member for controlling the flow of current to said heating unit, locking means adapted to hold said switch member in closed position, a pressure controlled member adapted upon the removal of pressure therefrom to partake of a retrograde movement, a valve for controlling the flow of water through said path and for controlling the exposure of said pressure controlled member to the water in said path, means interposed between said switch member and said pressure controlled member and adapted upon retrograde movement of the latter to become stressed, and means effective upon a predetermined stressing of said last-mentioned means to release said locking means and to permit said stressed member to return to substantially normal condition and thereby effect an opening of said switch member.

26. In apparatus of the character described, in combination, a switch member, locking means adapted to hold said switch member against movement, movable pressure responsive means adapted, upon movement, to control the operation of said switch member, yieldable means interposed between said movable pressure responsive means and said switch member and adapted upon movement of the former to become stressed, and means positioned in the path of movement of said pressure responsive means adapted, upon a predetermined movement of the latter, to release said locking means and permit the operation of said switch member.

27. In apparatus of the character described, in combination, a switch member, a pivotally mounted latch for holding said switch member against movement, a movable pressure responsive member adapted upon movement to control the operation of said switch member, and yieldable means interposed between said switch member and said pressure responsive means and adapted upon movement of the latter to become stressed, said pivotally mounted latch being provided with means positioned in the path of movement of said pressure responsive means adapted, upon a predetermined movement of said pressure responsive means, to swing said latch out of locking relation with said switch member and to permit said stressed means to effect a movement of said switch member.

28. In apparatus of the character described, in combination, a casing having a portion thereof shaped to provide a path of flow for water, an electric heating unit mounted in said portion of said casing and adapted when energized to heat the water passing therethrough, a movable switch member mounted in another portion of said casing and having a pressure responsive bellows for controlling the operation of said switch member, and a valve for controlling the flow of water through the portion of said casing in which said heating unit is mounted and for controlling the flow of water to said bellows.

29. In apparatus of the character described, in combination, a casing shaped to provide a path of flow for water and having an inlet and an outlet therefor, an electric heating unit in said casing adapted when energized to heat the water passing through said path, a pressure responsive switch for controlling the energization of said heating unit, a valve adjacent the inlet end of said path of flow for controlling the flow of water past said heating unit, and means for exposing said pressure responsive switch to the action of the pressure of the water between said valve and the outlet end of said path of flow for the water.

30. In apparatus of the character described, in combination, a switch member, a pair of pivotally mounted levers, one of which carries said switch member, means for yieldably holding said two levers together to constrain said levers to move together as a unit in one direction but to permit substantially independent movement in the other direction about their pivots, means for locking the lever which carries said switch member against movement, pressure responsive means adapted to move the other lever away from said switch carrying lever and thereby to stress the yieldable means holding said levers together, and means effective after a predetermined stressing of said yieldable means has taken place to release said locked lever and to permit said yieldable means to rapidly move said switch-carrying lever.

31. In apparatus of the character described, in combination, a switch member, a pair of pivotally mounted levers, one of which carries said switch member, means for yieldably holding said two levers together to constrain said levers to move together as a unit in one direction but to permit substantially independent movement in the other direction about their pivots, means responsive to pressure adapted to swing both of said levers as a unit to carry said switch member into circuit closing position, means effective upon the movement of said levers to lock said switch carrying lever in circuit closing position, said pressure responsive means being adapted, upon removal of the pressure effective thereon, to partake of a retrograde movement and to carry with it said other lever, thus stressing the yieldable connection between said two levers, and means responsive to a predetermined retrograde movement of said pressure responsive means to unlock said switch-carrying lever.

32. In apparatus of the character described, in combination, an upper member and a lower member, means movably mounting said members, a switch member mounted upon the upper member, means yieldably holding said upper and lower members together to permit said two members to move upwardly substantially as a unit, locking means adapted upon upward movement of said upper member to engage and hold said upper member with said switch member thereon, locking means adapted upon movement of said lower member in downward direction to engage and hold said lower member in lowermost position, a pressure responsive member, a connection between said pressure responsive member and said lower member adapted upon upward movement of said pressure responsive member to become stressed and upon retrograde movement of said pressure responsive member to stress the yieldable connection between said upper and lower members, means effective upon a predetermined pressure responsive movement of said pressure responsive means to disengage said locking means from said lower member and to permit the stressed connection between said lower member and said pressure responsive means to snap both the upper and lower members with said switch member in upward direction, and means effective upon a predetermined retrograde movement of said pressure responsive means to disengage said other locking means from said upper member and to permit the stressed connection between said upper and lower members to snap said upper member with the switch member thereon in downward direction.

33. In apparatus of the character described, in combination, an upper lever and a lower lever mounted to be swung about substantially the same axis, a switch member carried by one of said levers, means yieldably connecting said two levers to permit the latter to be moved substantially as a unit in one direction about their pivots, and adapted to permit one of said levers to be swung away from the other in the other direction about their pivots, means adapted upon movement of the upper lever about its pivot in one direction to engage and lock said lever, means adapted upon movement of the lower lever in the other direction to engage and hold said lower lever, a pressure responsive member, a connection between the lower lever and said pressure responsive member adapted upon movement of said pressure responsive member in one direction to yield and to become stressed and adapted upon movement of said pressure responsive member in the other direction to carry said lower lever with it, means effective after a predetermined movement of said pressure responsive member has taken place in one direction to disengage said locking means from said lower lever and to permit the stressed connections between said lower lever and said pressure responsive means thereupon to snap both of said levers about their pivots, and means effective after a predetermined movement in the other direction of said pressure responsive member has taken place to disengage said locking means from said upper lever and to permit the stressed connection between said two levers to snap the upper lever toward the lower lever.

In testimony whereof, I have signed my name to this specification this 20th day of February, 1923.

GEORGE E. HULSE.